(12) United States Patent
Uehara et al.

(10) Patent No.: US 7,121,618 B2
(45) Date of Patent: Oct. 17, 2006

(54) SUNROOF APPARATUS

(75) Inventors: Tatsuaki Uehara, Tochigi (JP);
Shigehito Horiuti, Tochigi (JP);
Masaharu Ohnishi, Saitama (JP)

(73) Assignees: Yachiyo Kogyo Kabushiki Kaisya,
Saitama (JP); Honda Motor Co., Ltd.,
Tokyo (JP)

( * ) Notice: Subject to any disclaimer, the term of this patent is extended or adjusted under 35 U.S.C. 154(b) by 0 days.

(21) Appl. No.: 11/096,412

(22) Filed: Mar. 31, 2005

(65) Prior Publication Data

US 2005/0218704 A1    Oct. 6, 2005

(30) Foreign Application Priority Data

Apr. 5, 2004    (JP) .............................. 2004-111642

(51) Int. Cl.
*B60J 7/22*    (2006.01)
(52) U.S. Cl. ....................................... 296/217; 296/217
(58) Field of Classification Search ......... 296/217 US,
296/217; 410/97, 117, 118, 121, 129; 244/118.1,
244/137.1, 110 C; 87/12, 13
See application file for complete search history.

(56) References Cited

U.S. PATENT DOCUMENTS 4,089,557 A * 5/1978 Leiter ........................ 296/221
4,966,409 A * 10/1990 Schmidhuber et al. ...... 296/213
6,457,769 B1 * 10/2002 Hertel et al. ................. 296/217

FOREIGN PATENT DOCUMENTS

JP    2002-274182    9/2002

* cited by examiner

*Primary Examiner*—Dennis H. Pedder
(74) *Attorney, Agent, or Firm*—Fish & Richardson P.C.

(57) ABSTRACT

The sunroof apparatus has a sunroof panel equipped at an opening of a fixed roof; a tilt mechanism that is provided beneath a side edge of the sunroof panel, and can tilt up the panel around a rotation axis that makes vehicle lateral directions axial directions thereof; and a side cover for shielding the tilt mechanism, seen from a vehicle room side in tilting up the panel, wherein the side cover has a plurality of cover members that overlap each other in the vehicle lateral directions, and each of which front end side is relative-rotation-free coupled each other around a coupling shaft of the cover members, and one of them is fixed at the panel and so that each of them is opened in tilting up the panel.

20 Claims, 15 Drawing Sheets

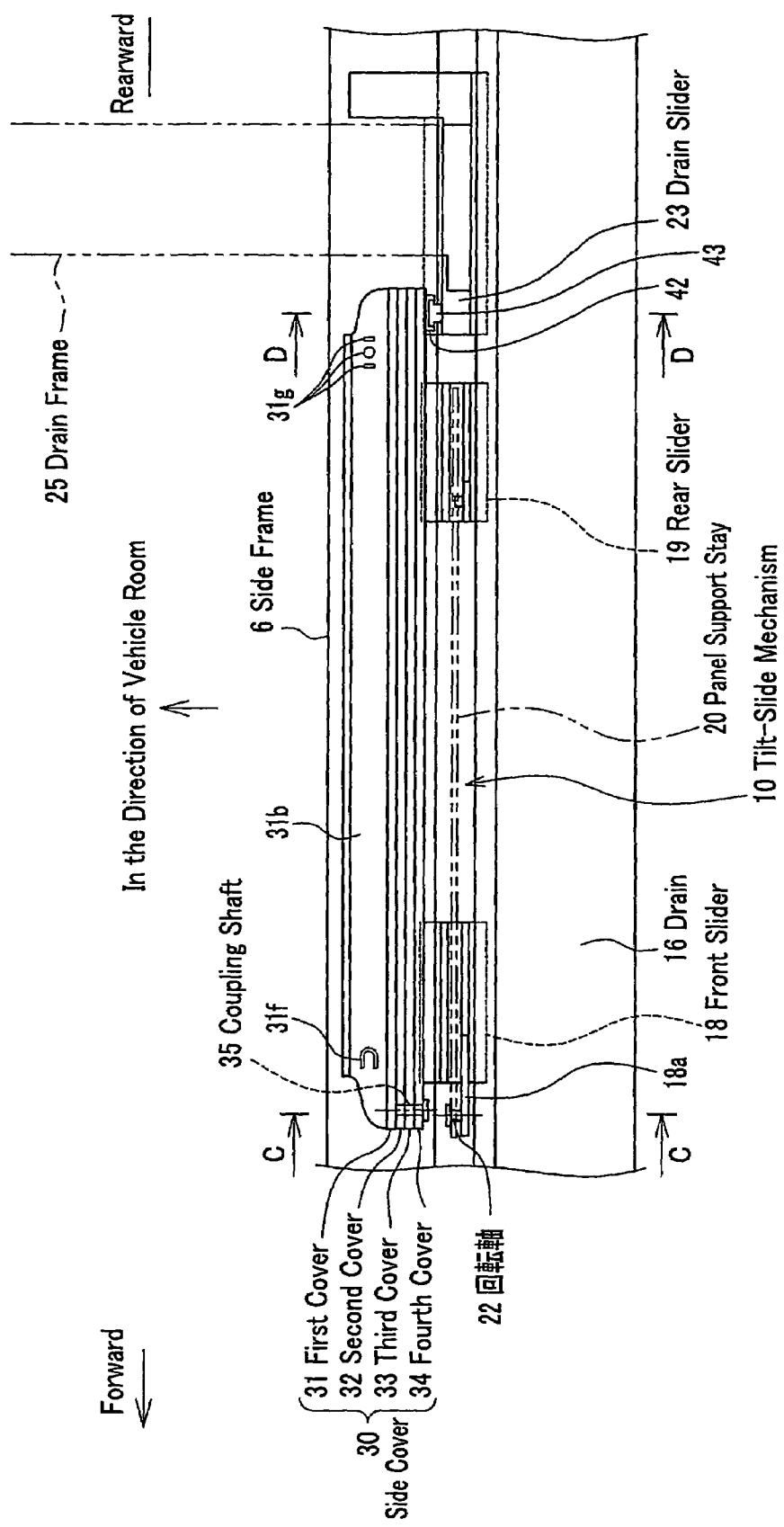

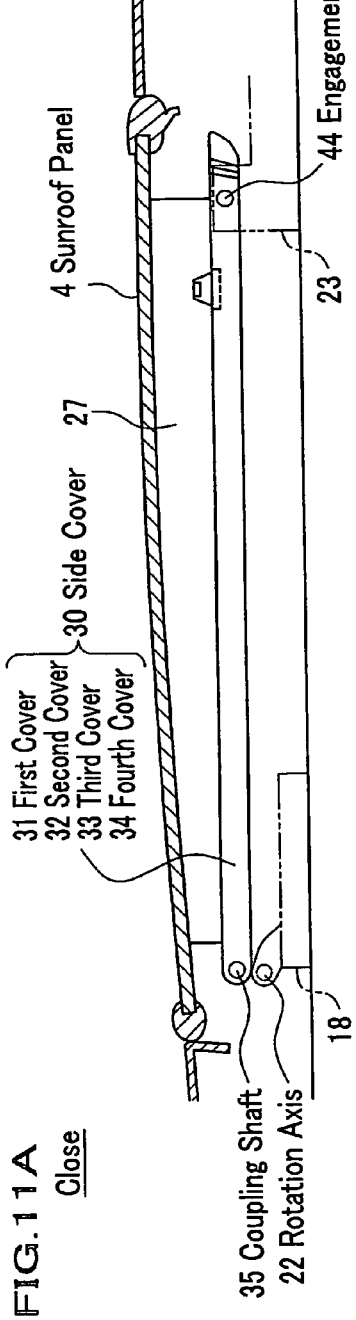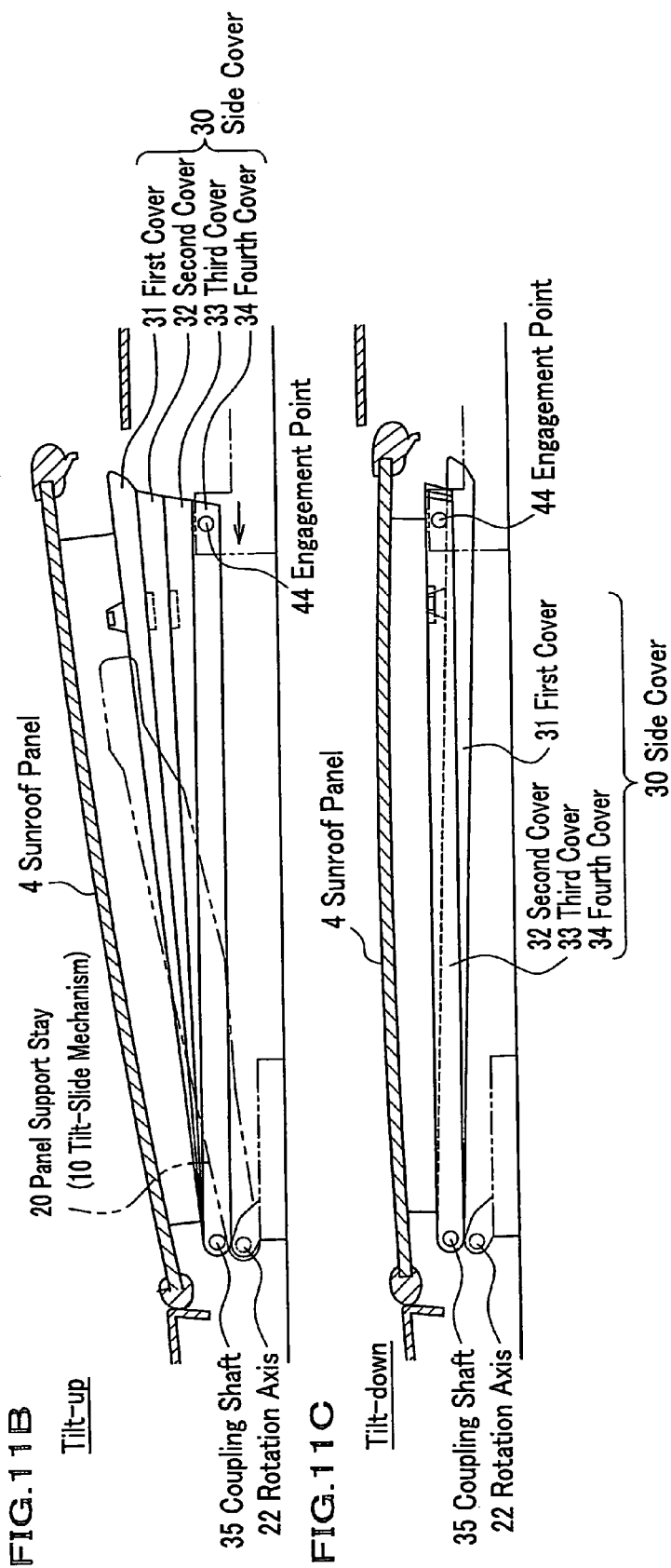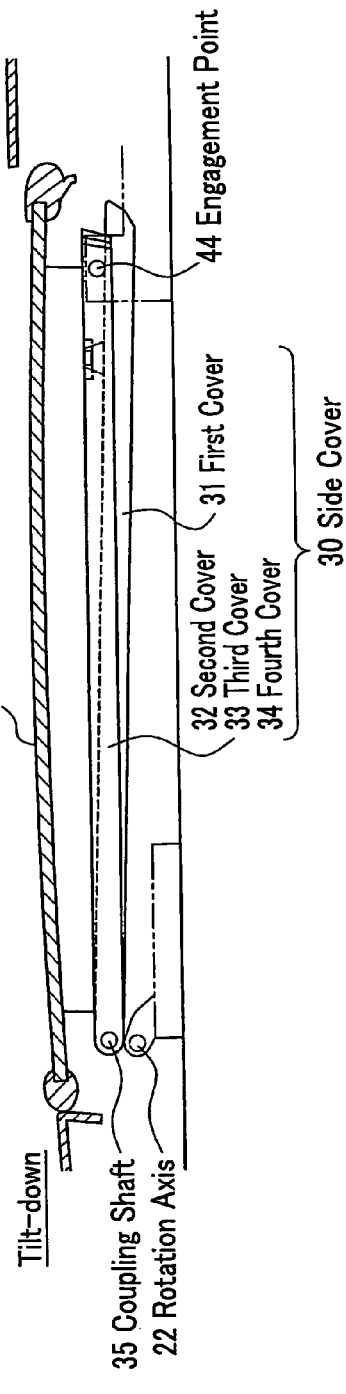

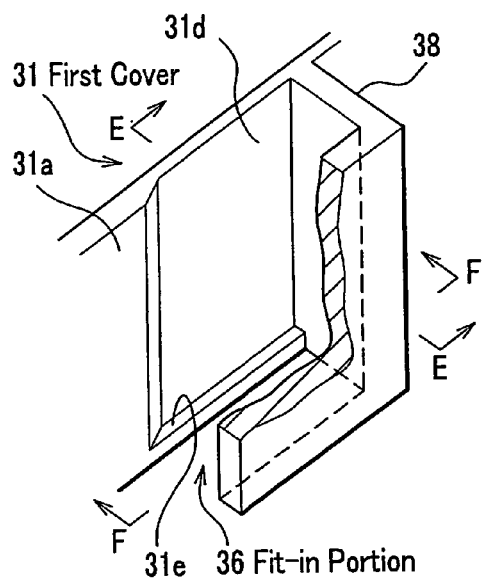
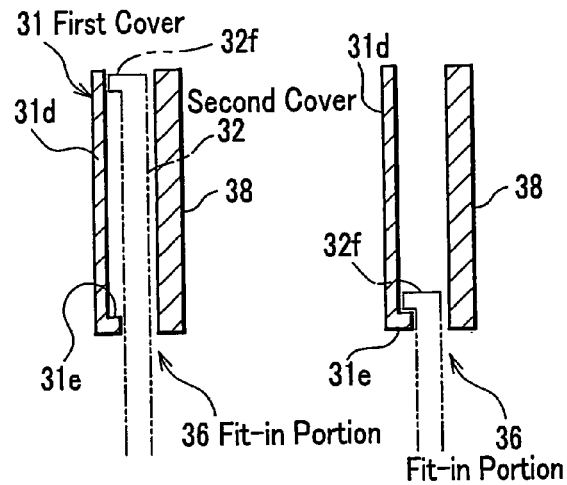
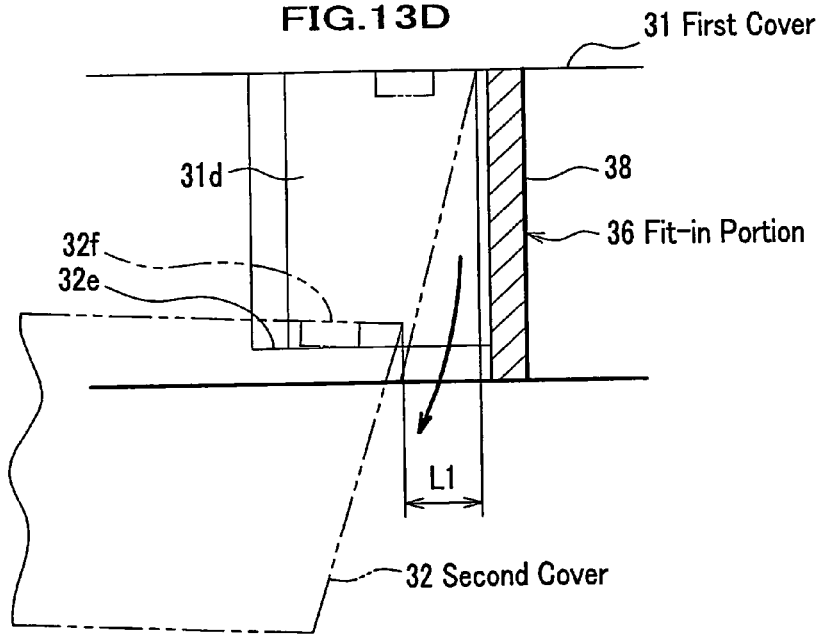
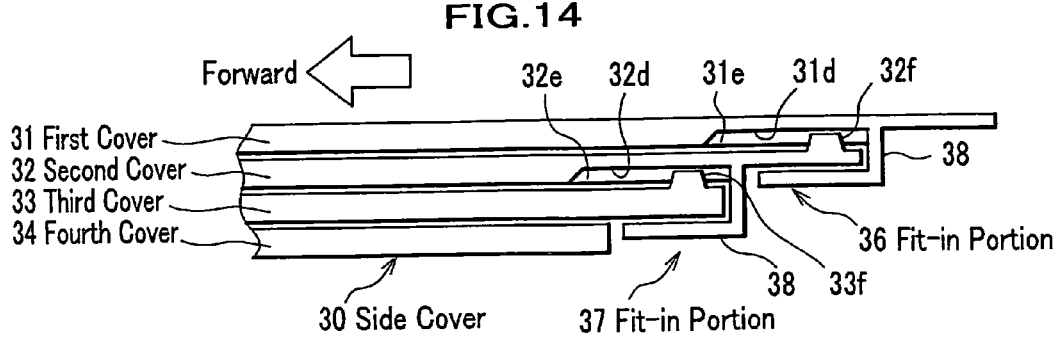

Tilt Angle of Sunroof Panel=Opening Angle of Side Cover
The coupling shaft and rotation axis are coaxial.

SUNROOF APPARATUS

BACKGROUND OF THE INVENTION

1. Field of the Invention

The present invention relates to a sunroof apparatus of a vehicle.

2. Description of the Related Art

As shown in FIG. 18, in a sunroof apparatus 1 consisting of a sunroof panel 4 such as a glass plate's being attached to an opening 3 of a fixed roof 2, there are many apparatuses of a structure, which enables a so called tilt-up of tilting up the sunroof panel 4 in a rearward rise for a purpose of a vehicle-inside ventilation and the like. FIG. 19 shows a case that a tilt-up state of the sunroof panel 4 is looked up from a vehicle room. A tilt mechanism for tilting up the sunroof panel 4 is positioned beneath a side edge of the sunroof panel 4, and therefore there is a possibility of causing disfigurement in tilting up the sunroof panel 4 because in some case the tilt mechanism is seen from the vehicle room as shown in FIG. 19, depending on a view angle. Consequently, conventionally is proposed a side cover for shielding a tilt mechanism in tilting-up a sunroof panel, for example, a extendable/contractible cornice cover and something where a plurality of cover members are used (for example, see paragraphs 0005 and 0006 and FIG. 2 of Japanese Patent Laid-Open Publication No. 2002-274182).

However, because such a side cover is placed together with a sunroof panel drive mechanism of a tilt mechanism and the like at a narrow space of a roof portion, it tends to become difficult to house members for configuring the side cover. Accordingly, restrictions for a number and form of configuring members become easy to be added, and in a structure using a plurality of cover members, there can also occur a case that a gap occurs between the cover members, depending on a tilt angle, and that the tilt mechanism cannot be completely shielded. In addition, in a structure of using the plurality of the cover members, because it is necessary to take care of a jouncing and positioning between the cover members, and also of a distinguished-looking of an opening/closing movement thereof.

Consequently, a following is strongly requested: a sunroof apparatus that has a simpler structure, can effectively shield a tilt mechanism in tilting up a sunroof panel, additionally makes it solid a positioning of each cover member opened in tilting up the sunroof panel, and furthermore has a side cover excellent in a distinguished looking of an opening/closing movement of the each cover member.

SUMMARY OF THE INVENTION

In order to solve the problems described above, the present invention is a sunroof apparatus comprising a sunroof panel equipped at an opening of a fixed roof; a tilt mechanism that is provided beneath a side edge of the sunroof panel, and can tilt up the sunroof panel around a rotation axis that makes vehicle lateral directions axial directions thereof; and a side cover for shielding the tilt mechanism, seen from a vehicle room side in tilting up the sunroof panel, wherein the side cover further comprises a plurality of cover members that overlap each other in the vehicle lateral directions, and each of which front end side is relative-rotation-free coupled each other around a coupling shaft of the cover members, and then one of the cover members is configured to be fixed at the sunroof panel and so that each of the cover members is opened in tilting up the sunroof panel, and wherein the coupling shaft is configured to be provided at a different position from said rotation axis of the sunroof panel and to rotationally move around the rotation axis in tilting up the sunroof panel.

In accordance with the configuration an opening angle of the side cover can easily be made different from a tilt angle of the sunroof panel, and the side cover can be opened at an appropriate angle, matching a form and arrangement of the tilt mechanism.

In addition, in tilting up a sunroof panel an opening angle of the side cover is configured to be set smaller than a tilt angle of the sunroof panel.

In accordance with the configuration, even when there occurs a gap between each rear end of cover members in itself, it is enabled to embed the gap without increasing a number of the cover members, and thus an appearance of the side cover is improved in tilting up the sunroof panel.

In addition, another cover member is configured so that when the coupling shaft rotationally moves around a rotation axis of a sunroof panel, a rear end side thereof linearly moves.

In accordance with the configuration the another cover member results in performing a movement of a conrod of making the rotation axis of the sunroof panel a rotation center of a crank, an opening movement of a side cover becomes smooth. In addition, a mechanism design of the side cover becomes easy.

In addition, a rear end side of the another cover member linearly moving is configured to be attached to a slider member for sliding in conjunction with a slide displacement of a sunroof panel.

In accordance with the configuration a jounce of a side cover can be effectively prevented without making a structure of the side cover complicated.

In addition, a rear end side of the another cover member linearly moving and the slider member are configured to be coupled by an engagement groove formed at either one of the two and an engagement pin, which is formed at the remaining one and linear-movably engages in the engagement groove.

In accordance with the configuration a coupling structure of the cover member and the slider member becomes simpler.

Furthermore, when the each cover member opens, it is configured to be formed so that each rear end thereof continues, accompanying a tilt-up of a sunroof panel.

In accordance with the configuration an appearance of the side cover is further improved in tilting up the sunroof panel.

In addition, when other adjacent cover members rotate at a rear end side of at least one cover member, a fit-in portion is configured to be provided that allows a displacement in an extending directional component of at least the one cover member at rear ends of the other adjacent cover members and that regulates a displacement in vehicle lateral directions.

In accordance with the configuration a positioning of cover members are made solid in tilting up the sunroof panel, and thereby a jounce of a side cover is prevented.

In addition, a sunroof apparatus comprises a plurality of cover members where the fit-in portion is provided, and each the fit-in portion is configured to be formed at a different position with respect to an extending direction of a side cover when the side cover is closed.

In accordance with the configuration, because each cover member can be overlapped with keeping a thickness of the each cover member thinner, a size of a whole side cover in vehicle lateral directions can be made compact.

In addition, it is configured that: the coupling shaft is integrally formed at a cover member positioned at one end side in vehicle lateral directions; other cover members are rotatably attached to the coupling shaft through a connection hole formed at each front end of the other cover members; a lock claw is protrudingly provided at the coupling shaft; a lock hole of a form corresponding to the lock claw at a coupling hole of a cover member positioned at the other end side in the vehicle lateral directions; and a pull-out stop is performed by the lock claw when the cover member positioned at the other end side is attached to the coupling shaft.

In accordance with the configuration the pull-out stop of the cover member positioned at the other end side is realized with a simpler structure, and a building work of the cover member also becomes simpler.

In addition, the side cover is configured to consist of at least not less than three cover members and to comprise an energizing mechanism for energizing each cover member to open in tilting up a sunroof panel, wherein in a central cover member sandwiched with one cover member and the other cover member, a reaction force relating to a rotation direction acting on the one cover member and another reaction force relating to a rotation direction acting on the other cover member are set to be different values, respectively, wherein the two reaction forces occur by the energizing mechanism.

In accordance with the configuration, because it is enabled to overlap a plurality of cover members in order from one side in a simpler structure, a sunroof apparatus becomes the apparatus having the side cover that is economical and excellent in a distinguished-looking of an opening/closing movement.

In addition, the side covers are left-right symmetrically provided as one pair for a sunroof panel, and in the one pair of side covers set values relating to the two reaction forces are set same.

In accordance with the configuration, because left/right side covers can be opened/closed by a same movement, a sunroof apparatus becomes the apparatus excellent in a distinguished-looking of an opening/closing movement.

In addition, in a central cover member a reaction force point acting on one cover member and another reaction force point acting on the other cover member are configured to be provided at positions of different distances from the coupling shaft.

In accordance with the configuration, for example, because different reaction forces can be set with using a same energizing mechanism, a side cover of a simpler structure can be established.

BRIEF DESCRIPTION OF THE DRAWINGS

FIG. 6 is a plan illustration drawing showing a layout of a tilt-slide mechanism and a side cover.

FIG. 11 is a side illustration drawing of a tilt-slide mechanism, seen from the B direction in FIG. 1.

FIG. 13A is a (partially exploded) perspective drawing around a fit-in portion; FIGS. 13B and 13C are E—E section drawings in FIG. 13A; and FIG. 13D is an F—F section drawing in FIG. 13A.

FIG. 14 is a plan illustration drawing around a rear end in a state of each cover's being closed.

DESCRIPTION OF THE PREFERRED EMBODIMENTS

Here will be described an embodiment of the present invention in detail, referring to drawings as needed.

Figure 18:
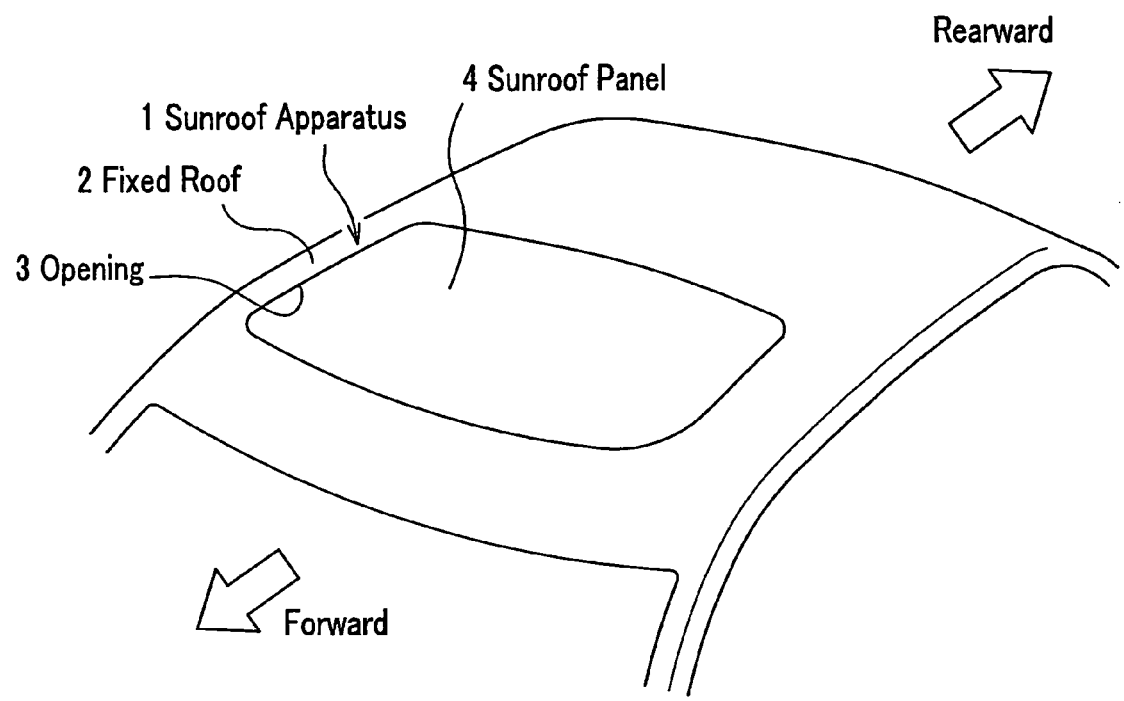
FIG. 18 is a perspective drawing when a sunroof apparatus is seen from an outside of a vehicle.
Figure 19:
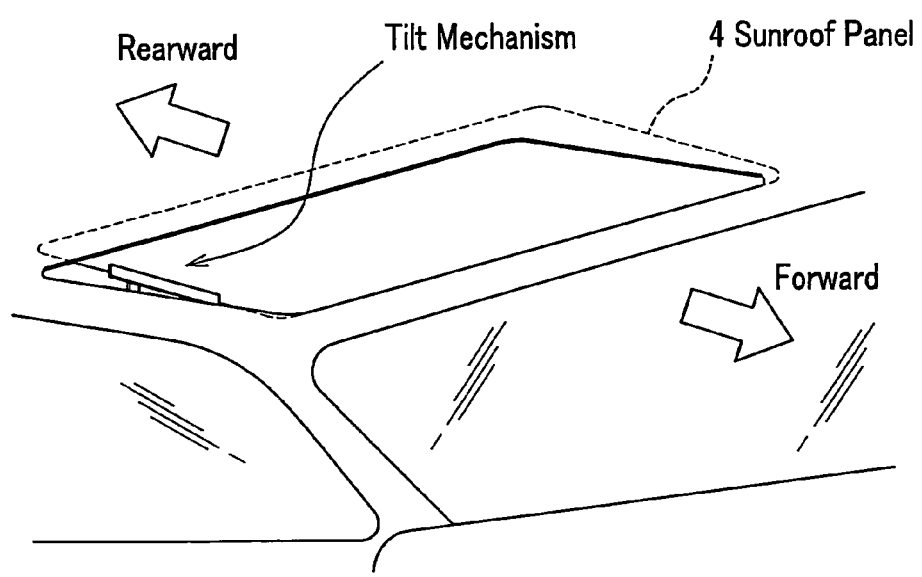
FIG. 19 is a perspective drawing when a state of a sunroof panel's being tilted up is looked up from a vehicle room.

As described in FIG. 18, a sunroof apparatus 1 of the present invention comprises a sunroof panel 4 that occludes a rectangular opening 3 formed at a fixed roof 2 in a close thereof, of which rear end side tilts up from a state of the close in a tilt-up thereof, and moves rearward with the sunroof panel 4 tilting down from the state of the close in a slide-open thereof. The sunroof panel 4 is, for example, configured of a panel made of glass, and as shown in FIG. 2, to a whole circumference edge is attached a weather strip 26 of an elastic body such as a rubber material.

Figure 1:
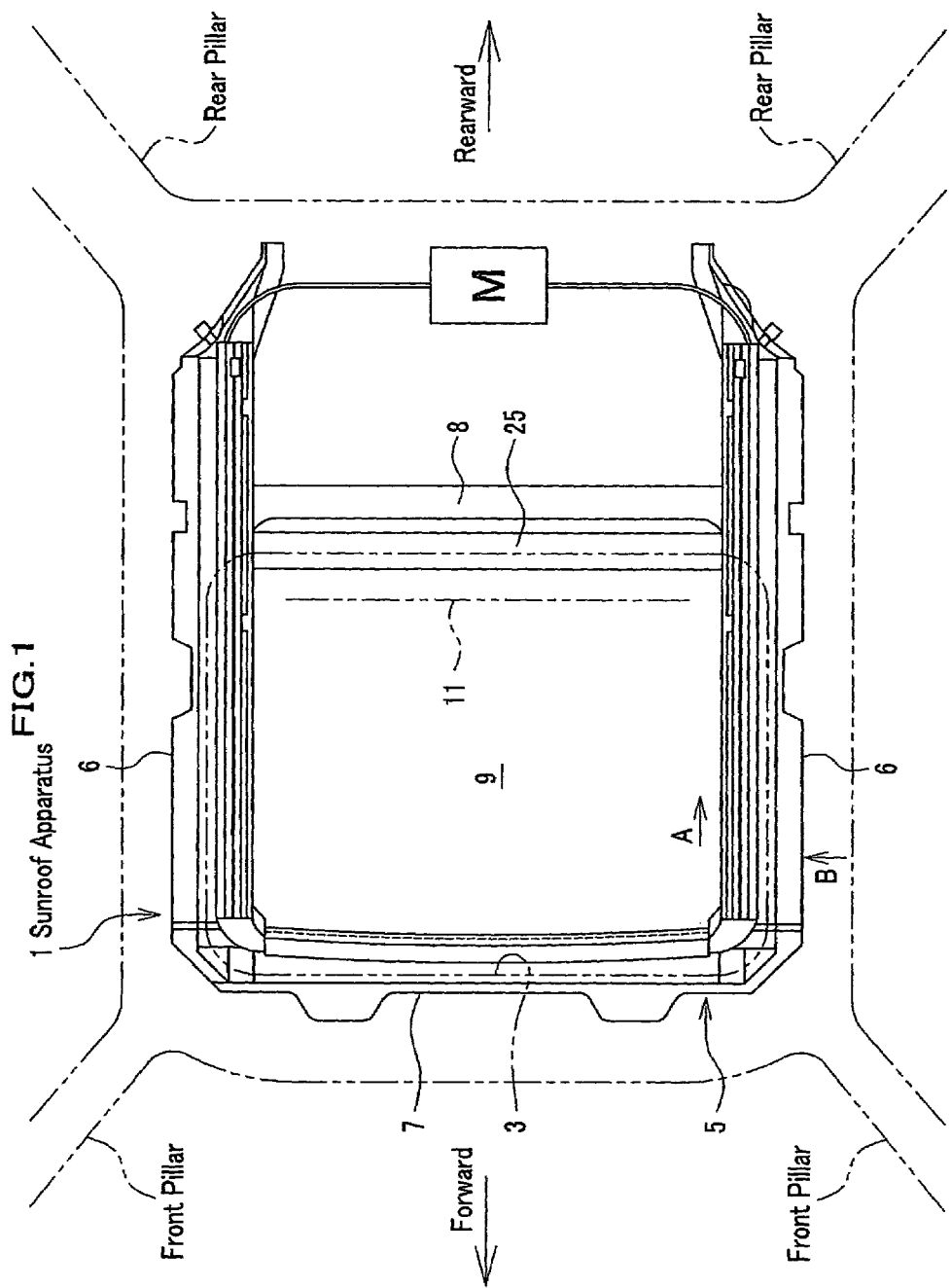
FIG. 1 is a plan illustration drawing configuring a sunroof apparatus of the present invention.

FIG. 1 is a plan illustration drawing of a frame 5 configuring the sunroof apparatus 1. The frame 5 makes it a main framework configuration one pair of left/right symmetrical side frames 6 extendedly provided in front/rear directions and a front frame 7 for connecting each front end of the side frames 6 extendedly provided in vehicle lateral directions, wherein each of the side frames 6 is positioned below each side edge of the opening 3 shown in a virtual line, and the front frame 7 is fixedly placed on a vehicle body so as to be positioned below a front edge of the opening 3. Ignoring frames at vehicle sides for interior linings, a portion surrounded by each inside edge of the left/right side frames 6, a rear edge of the front frame 7, and a front edge of the front frame 7 when a sunshade panel 11 described later is fully slid rearward configures an opening 9 substantially fronting a vehicle room inside. In addition, a reinforcement frame 8 is hung across between the both side frames 6 along the vehicle lateral directions.

Figure 2:
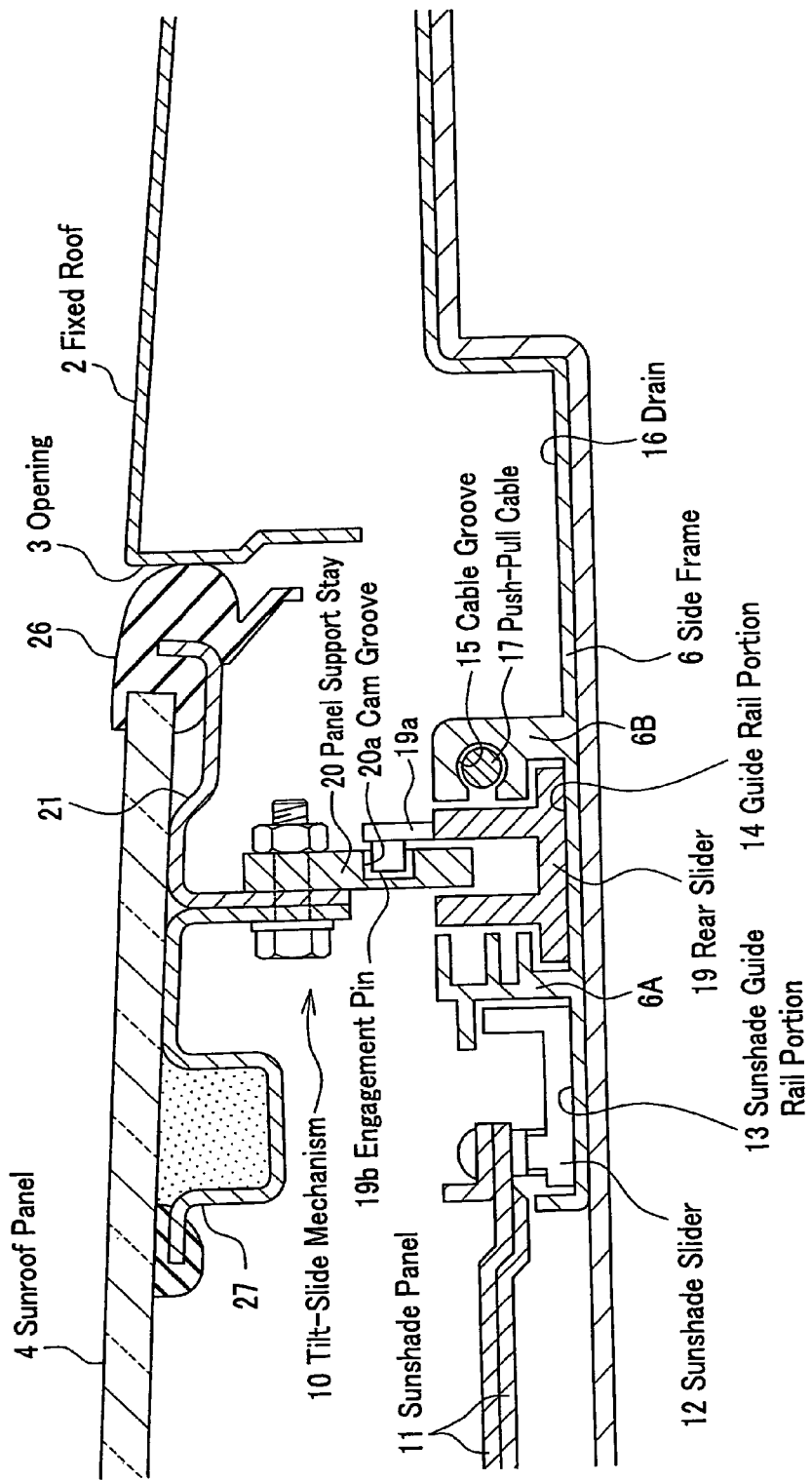
FIG. 2 is a section illustration drawing when a left side frame of a vehicle is seen from an A direction in FIG. 1.

FIG. 2 is a section illustration drawing when the vehicle left side frame 6 in FIG. 1 is seen from an A direction. The side frame 6 comprises, in order from the direction of the opening 9, a sunshade guide rail portion 13 for guiding a sliding of a sunshade slider 12 connected to the sunshade panel 11, a front slider 18 for configuring a tilt-slid mechanism 10 (FIG. 3), a guide rail portion 14 for guiding a sliding of a rear slider 19 and a sunshade slider 23 (FIG. 3), a cable groove 15 where a push-pull cable 17 connected to a motor M (FIG. 1) is inserted, and a drain 16 for discharging rainwater and the like. The sunshade guide rail portion 13 and the guide rail portion 14 are comparted by a first partition wall 6A perpendicularly rising up from a bottom portion of the side frame 6; the guide rail portion 14 and the drain 16 are comparted by a second partition wall 6B similarly rising up. As described later, to the rear slider 19 is connected the push-pull cable 17, and in order to insert through this connection portion, the cable groove 15 is formed inside the second partition wall 6B so that a part of the cable groove 15 fronts the guide rail portion 14. For example, the side frame 6 is formed by an extrusion molding of aluminum alloy: each portion of the sunshade guide rail portion 13, guide rail portion 14, cable groove 15, and drain 16 is integrally formed.

Figure 3:
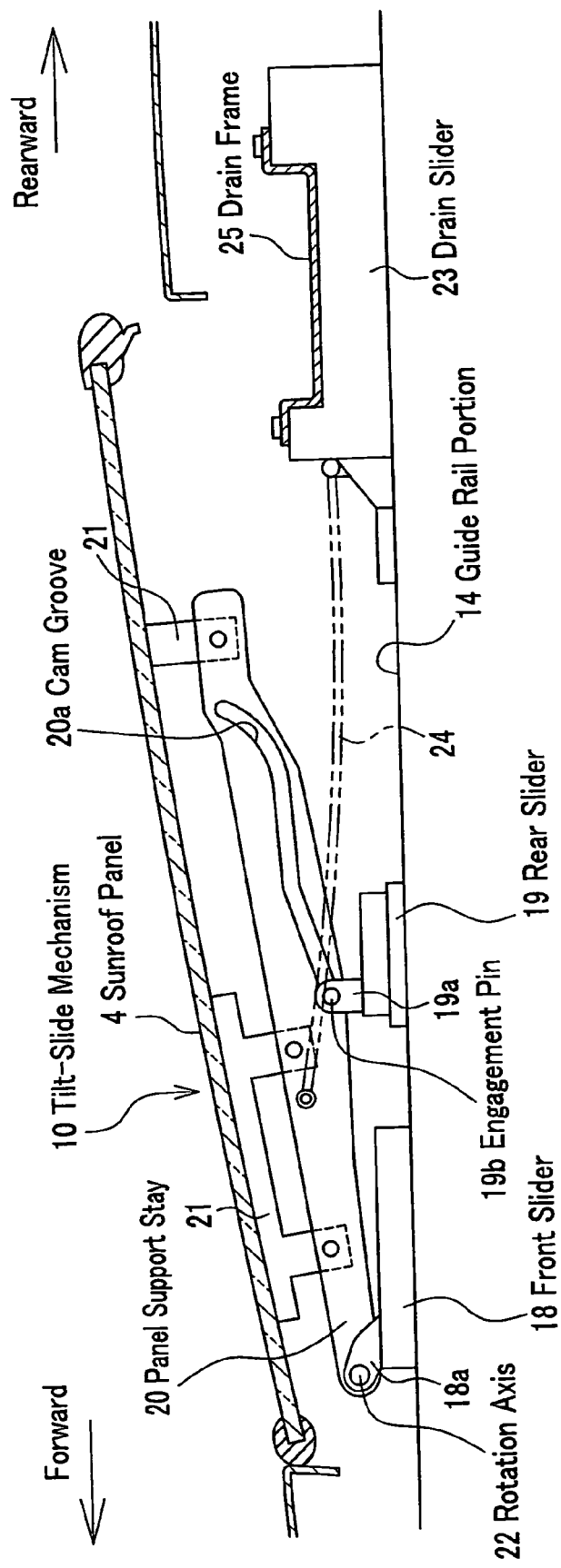
FIG. 3 is a side illustration drawing when a tilt-slide mechanism of a vehicle is seen from a B direction in FIG. 1.

Next will be described a tilt mechanism of the sunroof pane 4. In the embodiment it is described as the tilt-slide mechanism 10 also comprising a slide mechanism, referring to FIG. 3. FIG. 3 is a side illustration drawing of the tilt-slide mechanism 10, seen from a B direction in FIG. 1. The tilt-slide mechanism 10 is provided beneath a side edge of the sunroof panel 4 and comprises drive sliders (the front slider 18 and the rear slider 19) that are guided by the guide rail portion 14 and slide in front/rear directions of a vehicle; and a panel support-stay 20 for intervening between the sunroof panel 4 and the front slider 18, and the rear slider 19, extending in front/rear directions of the vehicle, and supporting the sunroof panel 4. On a lower face of the side edge of the sunroof panel 4 are fixedly provided a panel support bracket 27 (see FIG. 2) and a panel holder 21 by an adhesive and the like; the panel support-stay 20 is fastened to these panel support bracket 27 and panel holder 21 by bolts and the like.

At the front slider 18 is provided a bracket 18*a* for forming a rotation axis 22, and a front portion of the panel support-stay 20 is rotatably attached around the rotation axis 22. The axis 22 becomes a rotational center of the sunroof panel 4 in tilting up/down thereof. At the rear slider 19 is provided an engagement pin 19*b* through a bracket 19*a*: the engagement pin 19*b* engages (also see FIG. 2) in a cam groove 20*a* for the tilt-up/down formed at a approximately central portion in front/rear directions of the panel support-stay 20. To the rear slider 19 is connected a top end side of the push-pull cable 17 (see FIG. 2): the push-pull cable 17 moves forward/backward by normal/reverse rotations of the motor M (see FIG. 1), thereby the rear slider 19 slides along the guide rail portion 14, and the front slider 18 also slides in conjunction therewith through the panel support-stay 20.

Figure 4:
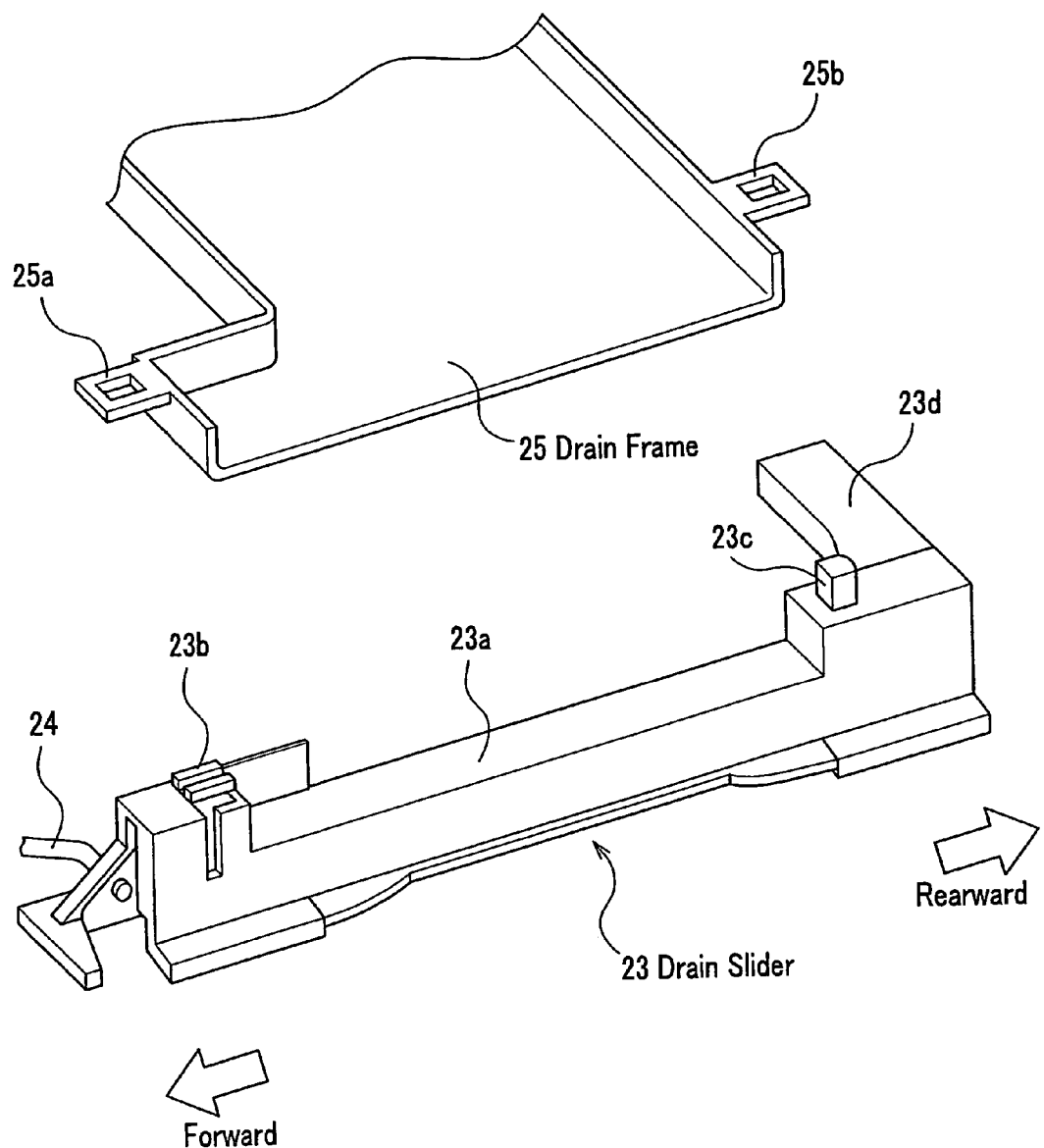
FIG. 4 is an appearance perspective drawing of a drain slider and a drain frame.

At a rearward of the rear slider 19 in the guide rail portion 14 is positioned a drain slider 23 connected to the panel support-stay 20 through a rod 24 (shown by a virtual line in FIG. 3). As shown in FIG. 4, the drain slider 23 shows an approximately cuboid form and forms a support portion 23*a* becoming concave upward at an approximately central potion in front/rear directions thereof; and hook portions 23*b* and 23*c* at each upper face in the direction of front/rear ends thereof, respectively. Meanwhile, at the rear end of the drain slider 23 is formed a stopper portion 23*d* for regulating a sliding of the sunshade slider 12, protruding to a side of the sunshade guide rail portion 13 shown in FIG. 2. The sunshade panel 11 shown in FIG. 2 is manually slidable, and the stopper portion 23*d* regulates the sliding then.

A symbol 25 in FIG. 4 is a drain frame for receiving rainwater and the like dripping from a rear edge of the sunroof panel 4 (see FIG. 3), and is arranged along the vehicle lateral directions as shown in FIG. 1. The drain frame 25 consists of a form of which upper portion is openly formed for receiving rainwater and the like: as proved in FIG. 4, a side end thereof fits in the support portion 23*a* of the drain slider 23, and at this time the hook portions 23*b* and 23*c* are respectively hooked at hooked portions 25*a* and 25*b* formed at front/rear of the side end of the drain frame 25, and thereby the drain frame 25 is fixed at the drain slider 23. The side end of the drain frame 25 fronts above the drain 16 shown in FIG. 2; thereby rainwater within the drain frame 25 flows down to the drain 16. The drain frame 25 always conjuncts with the sliding of the sunroof panel 4 as described later, and thereby is positioned beneath the rear edge of the sunroof panel 4 as shown in FIG. 3.

Figure 5A:
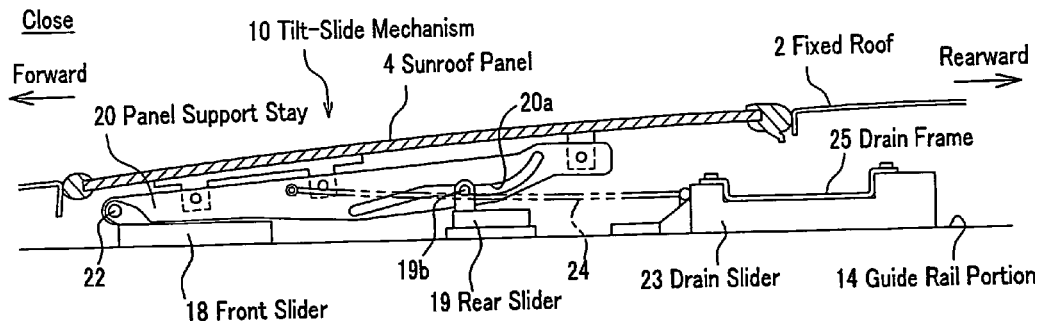
FIG. 5 is a side action illustration drawing of a tilt-slide mechanism.
Figure 5B:
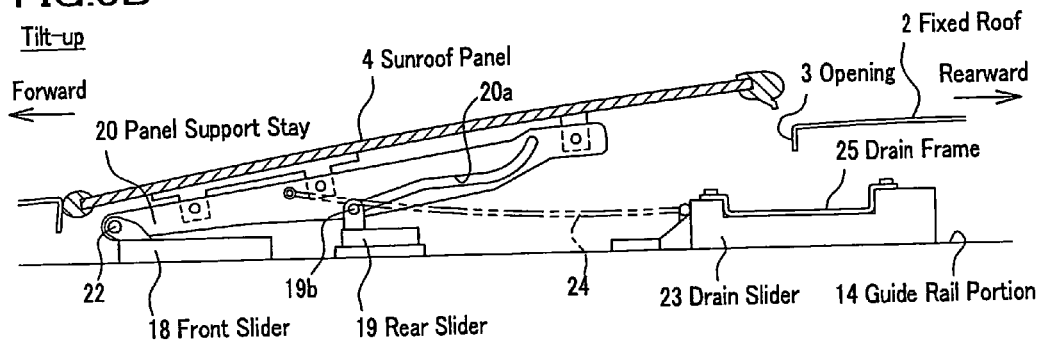

FIGS. 5A to 5D are side action illustration drawings of the tilt-slide mechanism 10: FIG. 5A shows a closed state of the sunroof panel 4, and at this time the engagement pin 19*b* is positioned at around middle of the cam groove 20*a*; from this state, if the rear slider 19 slides forward by the push-pull cable 17 (FIG. 2), as shown in FIG. 5B, the engagement pin 19*b* moves forward within the cam groove 20*a*, and thus the sunroof panel 4 tilts up in rear-up thereof, making the rotation axis 22 a rotation center thereof. From the state of FIG. 5B the rear slider 19 slides till an original rearward position by the push-pull cable 17, and thereby the sunroof panel 4 resumes the closed state of FIG. 5A. During this time the front slider 18 and the drain slider 23 remain stopped.

Figure 5C:
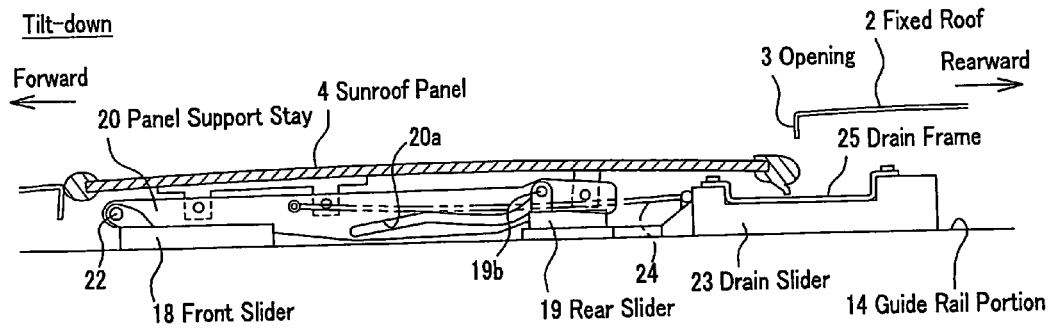
Figure 5D:
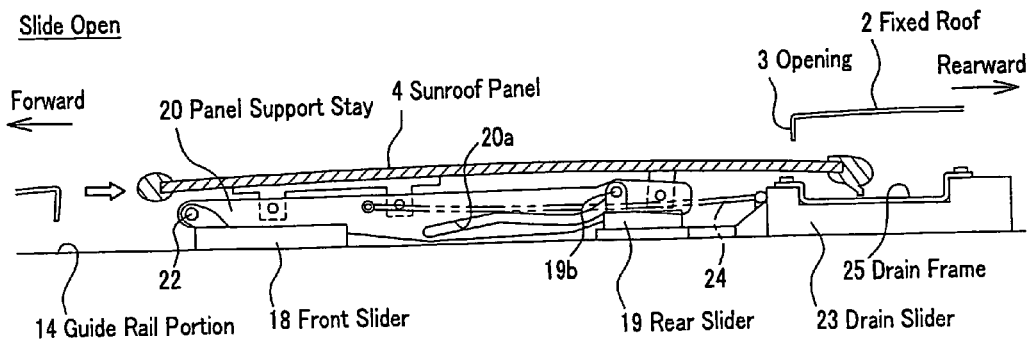

Next, if the rear slider 19 slides rearward from the state of FIG. 5A, the engagement pin 19*b* moves rearward within the cam groove 20*a* as shown in FIG. 5C, and the sunroof panel 4 tilts down in rear-down thereof, making the rotation axis 22 a rotation center thereof. From the state of FIG. 5C, if the rear slider 19 further slides rearward, the front slider 18 slides rearward in conjunction with the rear slider 19, as shown in FIG. 5D, the sunroof panel 4 slides open rearward in the state of the tilt-down. At this time the rear slider 19 abuts with the drain slider 23 and pushes it rearward, and thereby the drain frame 25 moves rearward so as to be always positioned beneath the rear edge of the sunroof panel 4. And if the rear slider 19 moves forward from the open state, the sunroof panel 4 is designed to move forward in the state of the tilt-down and to resume the state of FIG. 5C. At this time the drain slider 23 is pulled forward through the rod 24 and thereby slides forward in conjunction with the front slider 18 and the rear slider 19. Accordingly, the drain frame 25 is always positioned beneath the rear edge of the sunroof panel 4.

Figure 7:
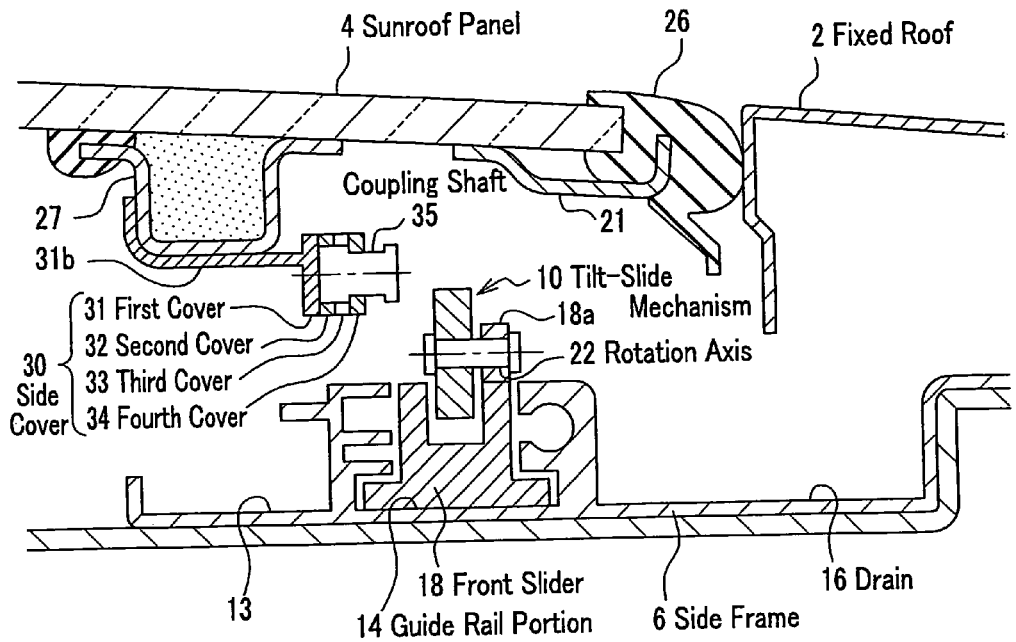
FIG. 7 is a C—C section illustration drawing in FIG. 6.
Figure 8:
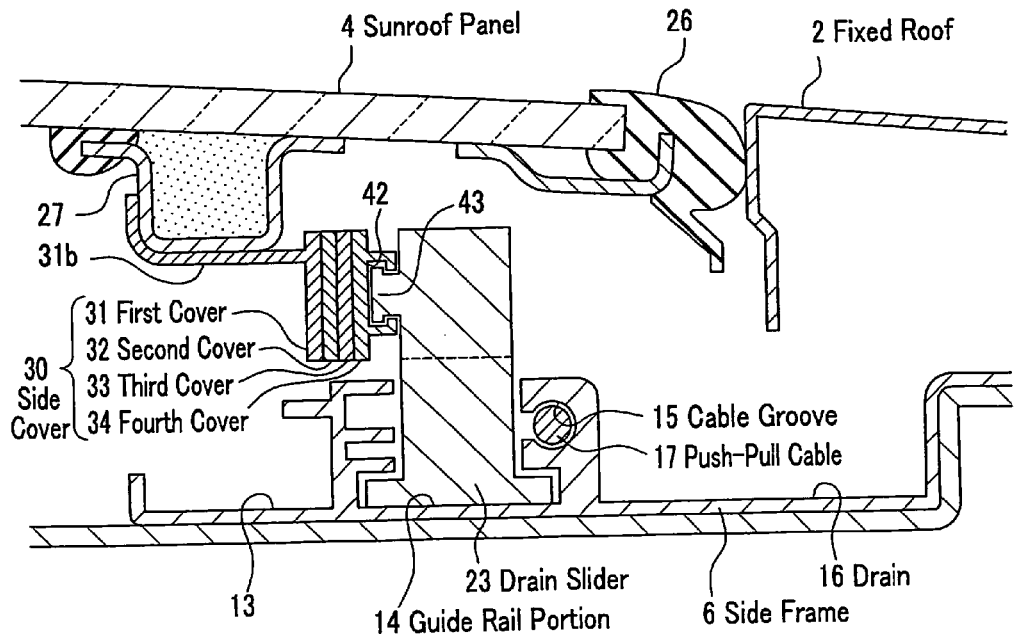
FIG. 8 is a D—D section illustration drawing in FIG. 6.
Figure 9:
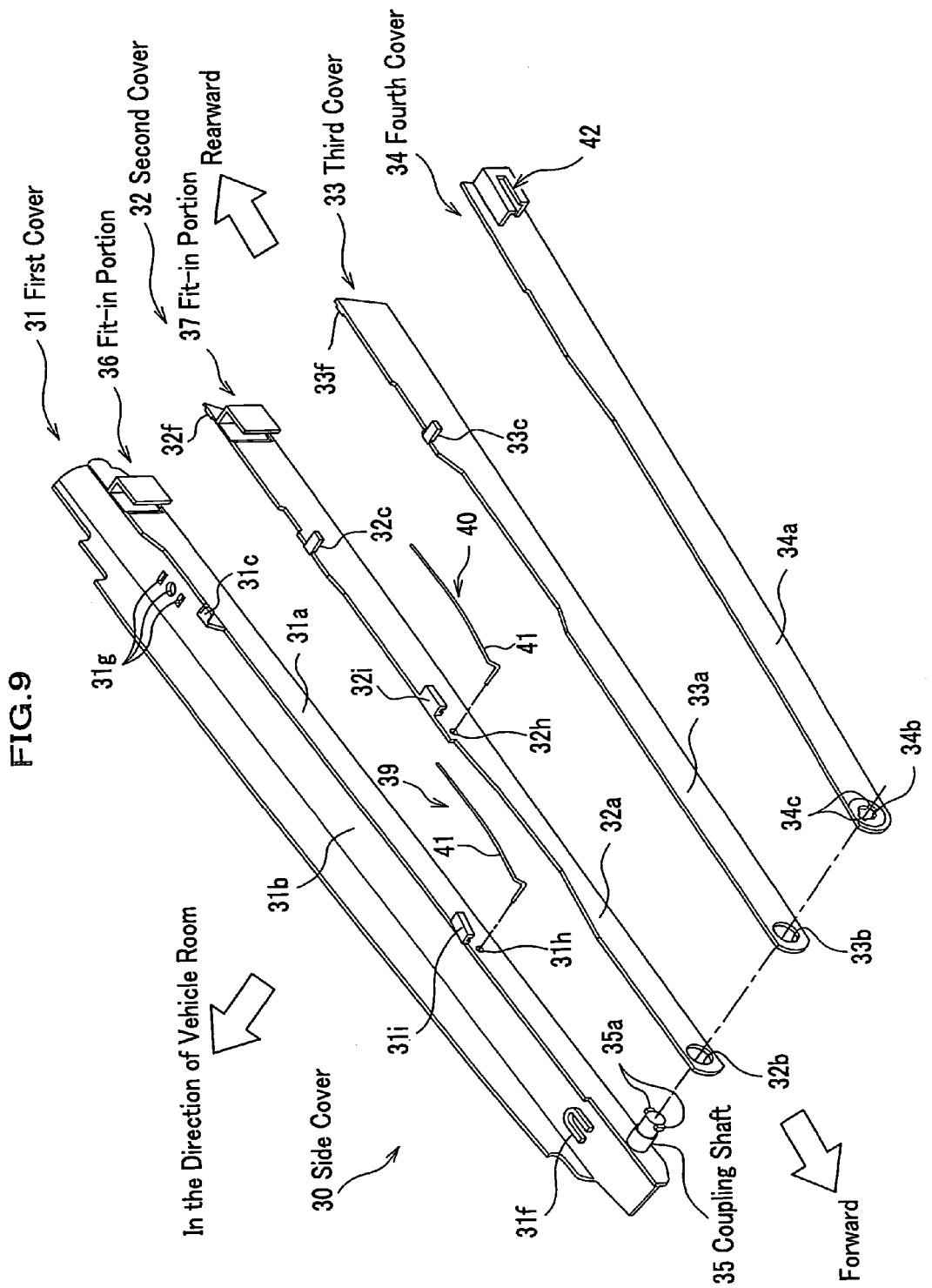
FIG. 9 is an exploded perspective drawing of a side cover.
Figure 10:
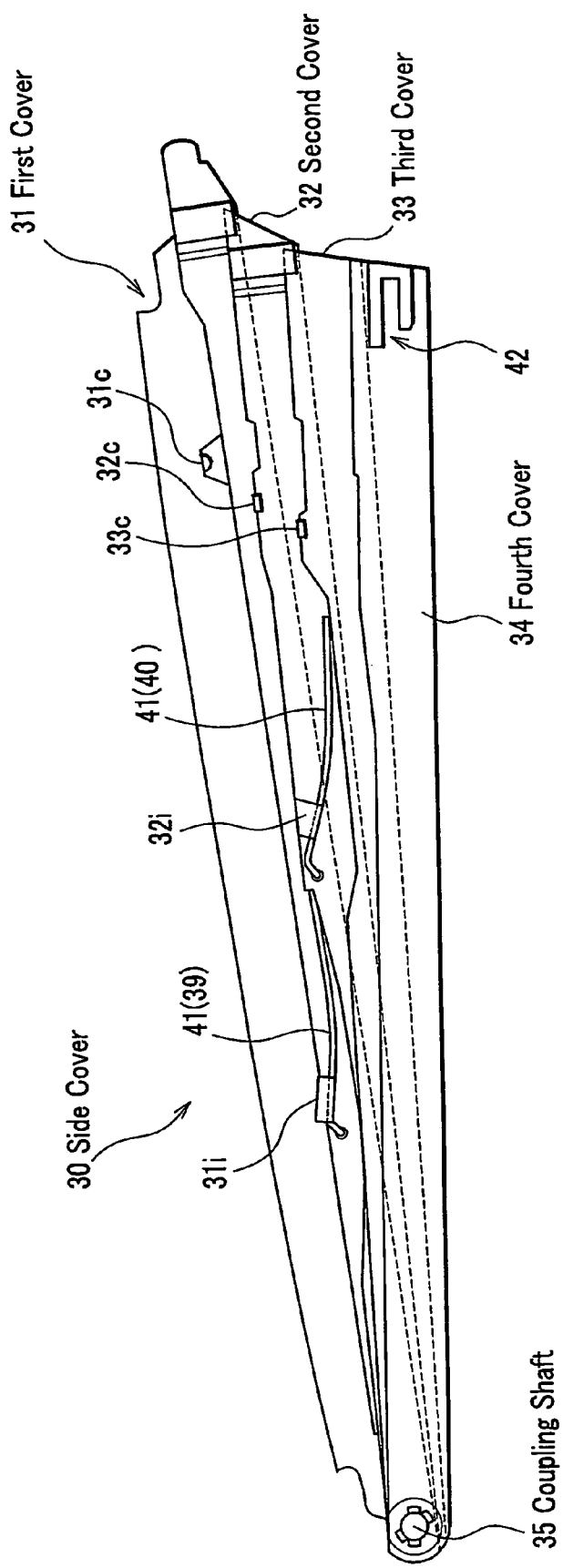
FIG. 10 is a side action illustration drawing of a side cover.
Figure 12:
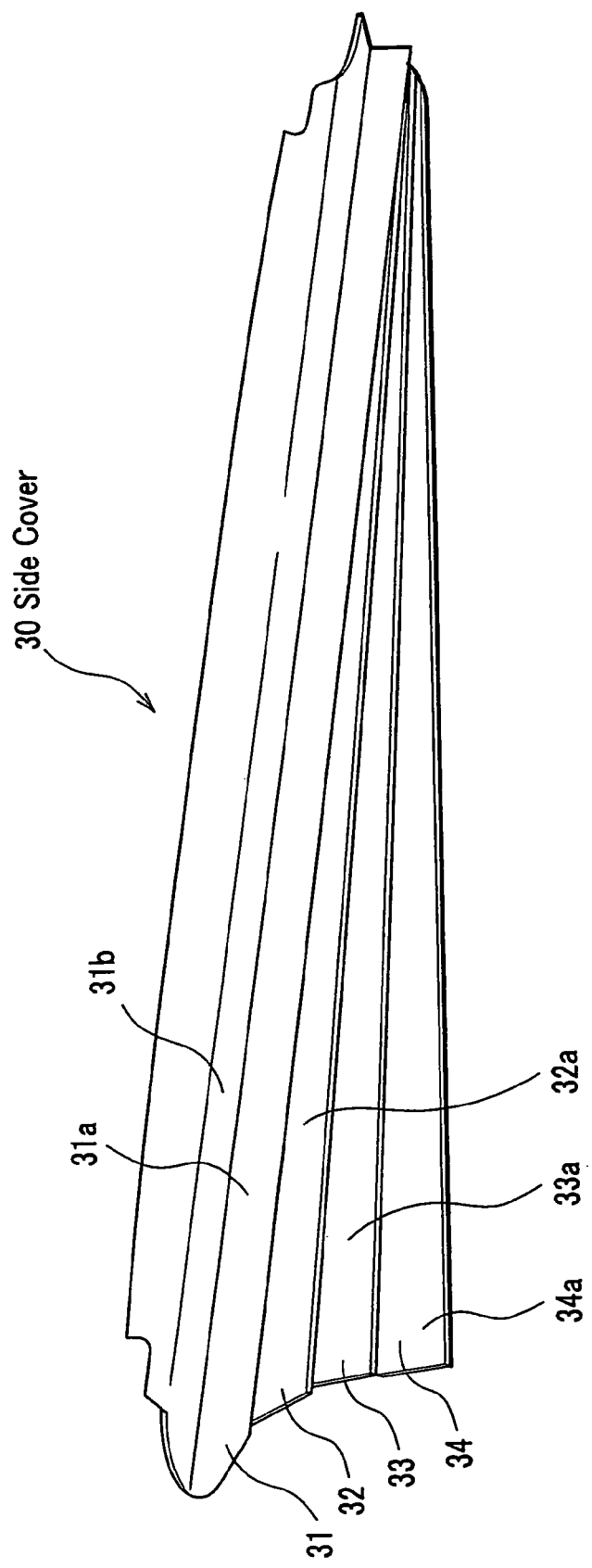
FIG. 12 is a reference perspective drawing when a side cover in a state of being opened is seen from a vehicle room side.

Next will be described a side cover for shielding the tilt-slide mechanism 10, seen a vehicle room side in tilting up the sunroof panel 4. FIG. 6 is a plan illustration drawing showing a relationship between the tilt-slide mechanism 10 and a side cover 30 on the side frame 6. FIGS. 7 and 8 are a C—C section illustration drawing and a D—D section illustration drawing in FIG. 6, respectively; FIG. 9 is an exploded perspective drawing of the side cover 30; and FIG. 10 is a side illustration drawing showing an opened state of the side cover 30. Meanwhile, FIG. 12 is a reference perspective drawing where the side cover 30 of the opened state is seen from a vehicle room side.

As proved in FIGS. 6 and 7, the side cover 30 is arranged in the direction of a center of a vehicle room than the tilt-slide mechanism 10, and comprises a plurality of cover members (in the embodiment four cover members: hereinafter referred to as a first cover 31, second cover 32, third cover 33, and fourth cover 34 in order from the direction of the center of the vehicle room). Each of the covers overlaps in vehicle lateral directions, and each front side thereof is relative-rotation-free coupled each other around a coupling shaft 35 of which axis direction is made the vehicle lateral directions. The first cover 31 of one of them is fixed at the sunroof panel 4 through the panel support bracket 27 as shown in FIGS. 7 and 8.

As shown in FIG. 9, the first to fourth covers 31 to 34 respectively comprise shields 31a to 34a like a perpendicular plane, which extend along vehicle front/rear directions, and these shields 31a to 34a become portions that overlap in vehicle lateral directions as described above. While the second to fourth covers 32 to 34 make the respective shields 32a to 34a themselves approximately main body forms thereof, the first cover 31 is designed to be a form, in addition to the shield 31a, also having a fixed portion 31b that horizontally extends toward the direction of the center of the vehicle room across front/rear ends of the shield 31a. At front/rear of an upper face of the fixed portion 31b are formed hooked portions 31f and 31g: the hooked portions 31f and 31g are hooked at a hook portion (not shown) formed at a lower face of the panel support bracket 27 shown in FIG. 7 and the like, and thereby the upper face of the fixed portion 31b and the lower face of the panel support bracket 27 make contact, and thus the first cover 31 is fixed at the sunroof panel 4.

At the front/rear ends of the shield 31a of the first cover 31 is formed the coupling shaft 35; at respective front ends of the second to fourth covers 32 to 34 are drilled coupling holes 32b to 34b for inserting through the coupling shaft 35, and by coupling the coupling shaft 35 and the coupling holes 32b to 34b, the first to fourth covers 31 to 34 are relative-rotatably built in each other around the coupling shaft 35. And at the top end of the coupling shaft 35 and at the coupling hole 34b of the cover 34 are respectively formed a lock claw 35a and a lock hole 34c having a function of a pull-out stop. The lock claw 35a is protrudingly provided at the top end of the coupling shaft 35 as a pair therewith, the lock hole 34c shows a form corresponding to the lock claw 35a so that the claw 35a can insert through it, and is formed as a pair with the coupling hole 34b. Respective coupling holes 32b and 33b of the second and third covers 32 and 33 are formed as round holes of a larger diameter so as to be able to receive the lock claw 35a. When the fourth cover 34 is built in the coupling shaft 35 and configures the side cover 30, a pull-out stop of the fourth cover 34 is performed by the lock claw 35a. Providing such the structure of the pull-out stop, the pull-out stop of the fourth cover 34 is realized with a simpler structure. Because the second and third covers 32 and 33 can be smoothly attached to the coupling shaft 35 as they are, a building work also becomes easier.

At respective upper edges of the first to third covers 31 to 33 are formed stoppers 31c to 33c for regulating these opening in a reverse direction by abutting with respective upper edges of the second to fourth covers 32 to 34. In addition, in the first cover 31 is formed a fit-in portion 36 in the direction of a rear end of a face opposing the second cover 32; in the second cover 32 is formed a fit-in portion 37 in the direction of a rear end of a face opposing the third cover 33. Because the fit-in portions 36 and 37 are a same configuration each other, one fit-in portion 36 will be described, referring to FIGS. 13A to 13D and FIG. 14. In FIGS. 13A to 13D FIG. 13A is a (partially exploded) perspective drawing around the fit-in portions 36; FIGS. 13B and 13C are E—E section drawings in FIG. 13A; and FIG. 13D is a F—F section drawing in FIG. 13A. In addition, FIG. 14 is a plan illustration drawing around a rear end in a state of each cover's being closed.

The fit-in portions 36 comprises a guide wall 38 protrudingly provided as an L-letter form in a plan section view so that a front side from the shield 31a becomes an opening, wherein a rear end periphery of the second cover 32 (shown in a virtual line in FIG. 13) is designed to fit inside an inner space surrounded by the guide wall 38 and the shield 31a. The fit-in portions 36 allows a displacement in a front/rear directional component (to be more precise, a displacement in an extending-directional component of the first cover 31) L1 of a rear end thereof occurring, as shown in FIG. 13D, when the second cover 32 relatively rotates; and bears a function of regulating a displacement in the vehicle lateral directions, a displacement in directions orthogonal to the face of the second cover 32. Thus a positioning around the rear end periphery of the second cover 32 for the first cover 31 becomes solid, and thereby a jounce thereof is prevented. A case of the fit-in portion 37 is similar, and a positioning around a rear end periphery of the third cover 33 for the second cover 32 becomes solid Meanwhile, in the embodiment, in the shield 31a fronting the inner space of the fit-in portion 36, a thin portion 31d of a rectangular form in a side view thereof is formed so that a lower edge thereof remains, the lower edge is made a stopper 31e; at an upper edge of the shield 32a of the second cover 32 is formed a hook 32f. FIG. 13B is a state of the rear end periphery of the second cover 32 overlapping the first cover 31, and from this state, if the second cover 32 relatively rotates, as shown in FIG. 13C, the hook 32f abuts with the stopper 31e, and thereby a positioning of a rotation direction of the second cover 32 for the first cover 31 is performed. In the embodiment the displacement in the vehicle lateral directions is regulated by the hook 32f abutting with the thin portion 31d. As shown in FIG. 14, also at a side of the fit-in portion 37 are formed a thin portion 32d and a stopper 32e: at the third cover 33 is formed a hook 33f, and thereby a positioning of a rotation direction of the third cover 33 for the second cover 32 is performed.

The fit-in portions 36 and 37 thus described are formed, as proved in FIG. 14, at different positions in extending directions (vehicle front/rear directions) of the side cover 30. Thus, while keeping a thickness of the each cover thinner, it is enabled to overlap each other; accordingly, a size of a whole of the side cover 30 in the vehicle lateral directions can be made compact.

Next as shown in FIG. 9, between the first cover 31 and the second cover 32 is provided an energizing mechanism 39 for energizing both in an opening direction thereof; between the second cover 32 and the third cover 33 is provided an energizing mechanism 40 for energizing both in an opening direction thereof. The embodiment, as described in the "SUMMARY OF THE INVENTION," is designed to be a configuration that "in a central cover member sandwiched with one cover member and the other cover member, a reaction force relating to a rotation direction acting on the one cover member and another reaction force relating to a rotation direction acting on the other cover member are set to be different values, respectively, and wherein the two reaction forces occur by the energizing mechanism." In this case the second cover 32 corresponds to the central cover member, and one of the first cover 31 and the third cover 33 corresponds to either the one cover member or the other cover member; the other one corresponds to the remaining cover member.

Thus making reaction forces relating to moments different, a plurality of covers can be orderly overlapped from one side. For example, if setting a value of a reaction force acting between the first cover 31 and the second cover 32 larger than that between the second cover 32 and the third cover 33, in opening, for example, the first cover 31 and the second cover 32 previously open each other; in closing, on the contrary, the second cover 32 and the third cover 33 previously close like overlapping each other. Thus orderly overlapping each cover from one side, the side cover 30 becomes excellent in a distinguished looking of an opening/closing movement. Of course, setting respective similar reaction forces with respect to a pair of side covers 30 left-right symmetrically provided beneath side edges of the sunroof panel 4, the left/right side covers 30 can be opened/closed by a same movement, and thereby the side covers 30 become more excellent in a distinguished looking of an opening/closing movement thereof.

In addition, providing a reaction force point acting on one cover and a reaction force point acting on the other cover at positions of different distances from the coupling shaft 35, energizing mechanisms with a same specification can be used. In the embodiment each spring bar 41 with a same specification is used as the energizing mechanisms: one end of each the spring bar 41 is inserted and fixed in support holes 31h and 32h, and the other end thereof is, as shown in FIG. 10, joined with pressure to each upper edge of the second cover 32 and the third cover 33. At the shields 31a and 32a are formed guide portions 31i and 32i for holding part of the spring bar 41.

As proved in FIG. 10, one spring bar 41 (energizing mechanism 39) intervening between the first cover 31 and the second over 32 is positioned at a nearer distance to the coupling shaft 35 than the other spring bar 41 (energizing mechanism 40) intervening between the second cover 32 and the third cover 33. Accordingly, in this case a value of a reaction force acting between the first cover 31 and the second over 32 becomes larger than that acting between the second cover 32 and the third cover 33 with respect to moments thereof: as described above, in opening the first cover 31 and the second cover 32 previously open each other; on the contrary, in closing the second cover 32 and the third cover 33 previously close like overlapping each other.

Figure 17:
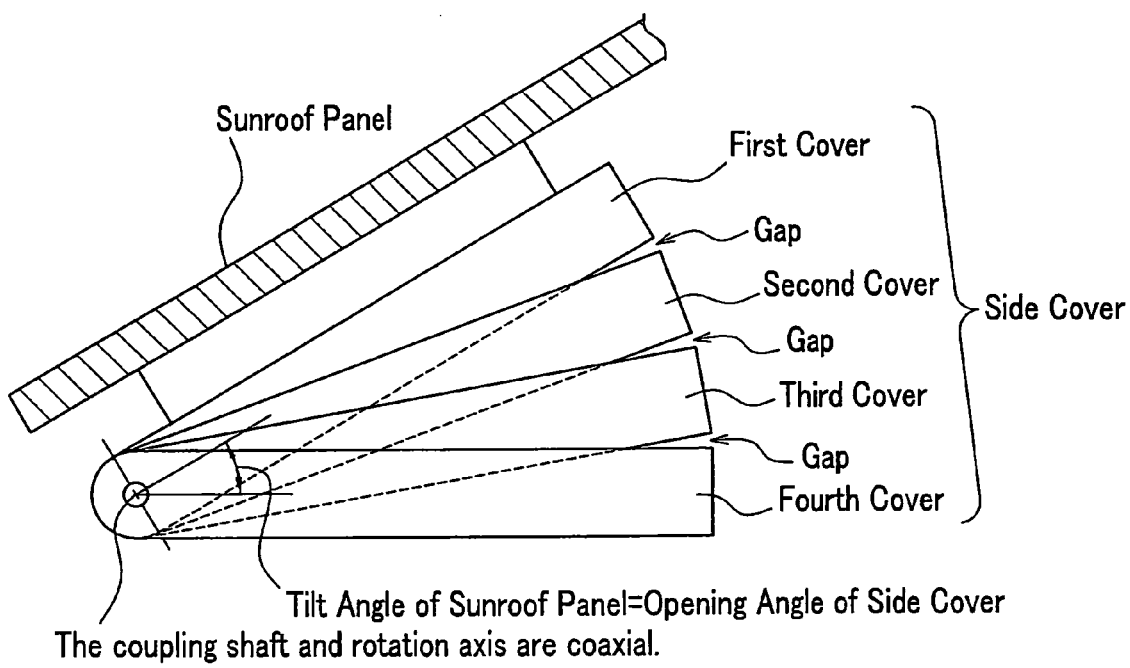
FIG. 17 is a schematic drawing when a coupling shaft and a rotation axis are coaxially set.

Next, as shown in FIG. 11 (side action illustration drawing of the side cover 30), the coupling shaft 35 is designed to be provided at a different position from the rotation axis 22 of the sunroof panel 4 and to rotationally move around the rotation axis 22 in tilting up the sunroof panel 4. Here considering a case that the coupling shaft 35 is made coaxial with the rotation axis 22, because a first cover is fixed at a sunroof panel 4 as shown in FIG. 17 as a schematic drawing, in a case of assuming a position of a fourth cover is fixed, an opening angle of a side cover becomes equal to a tilt angle of the sunroof panel in tilting up the sunroof panel. In other words, the opening angle of the side cover results in being inevitably decided by the tilt angle of the sunroof panel.

Accordingly, in such the structure it becomes difficult to open a side cover at an appropriate angle, matching a form and arrangement of a tilt mechanism of a shied object. At such the time, for example, if when a gap occurs between rear ends of respective covers as shown in FIG. 17, an opening angle of the side cover can be set smaller within being able to shield the tilt mechanism, it is convenient because the gap can be embedded without increasing a number of covers. In addition, according to a form of a tilt mechanism and the like if any, a case is also assumed that it is more advantageous in designing to be able to set the opening angle of a side cover larger than the tilt angle of a sunroof panel. The present invention is found, focusing attention on such the problems: rotating the coupling shaft 35 around the rotation axis 22 of the sunroof panel 4 as shown in FIG. 11, it is enabled to easily make the opening angle of the side cover 30 different for the tilt angle of the sunroof panel 4.

Firstly as shown in FIG. 9, at a side fronting a tilt mechanism (not shown) of a rear end side of the fourth cover 34, provide a wall portion protrudingly, and form an engagement groove 42 along extending directions (strictly speaking, directions connecting the rotation axis 22 shown in FIGS. 11A to 11C and an engagement point 44 described later) of the fourth cover 34. And as shown in FIG. 8, provide an engagement pin 43 protrudingly at a side of the drain slider 23, and engage it in the engagement groove 42. Assuming that an engagement position of the engagement groove 42 and the engagement pin 43 is called the engagement point 44, a rear end of the fourth cover 34 is designed according to an intervention of the engagement point 44 to be regulated in a displacement of vehicle lateral directions for the drain slider 23, to be rotatable around the engagement point 44, and so that a displacement in the extending directions (strictly speaking, directions connecting the rotation axis 22 shown in FIGS. 11A to 11C and the engagement point 44) of the fourth cover 34 becomes enabled.

An action of the side cover 30 will be described. In FIG. 11A the sunroof panel 4 is in a state of a close thereof, and then each cover of the side cover 30 is in a state of overlapping each other. The coupling shaft 35 is positioned at a different position (above in FIG. 11A) from the rotation axis 22. From this state, if the sunroof panel 4 is tilted up as in FIG. 11B, it rotates with making the rotation axis 22 its center. Because the first cover 31 of the side cover 30 is fixed at the sunroof panel 4, it also rotates with making the rotation axis 22 its center; accompanying it, the coupling shaft 35 also rotates with making the rotation axis 22 its center. At this time the engagement point 44 linearly moves forward in a vehicle thereof, and thereby the fourth cover 34 follows a rotational displacement of the coupling shaft 35. In other words, the fourth cover 34 makes a movement of a conrod of making the rotation axis 22 a rotation center of a crank. And by the energizing mechanisms 39 and 40 and the like shown in FIG. 9, the second cover 32 and the third cover 33 are positioned between the first cover 31 and the fourth cover 34: the side cover 30 becomes an open state and thereby shields the panel support-stay 20 (tilt-slide mechanism 10) shown in a virtual line. Meanwhile, in a tilt-down of FIG. 11C nothing but the first cover 31 is designed to rotate downward.

Figure 15A:
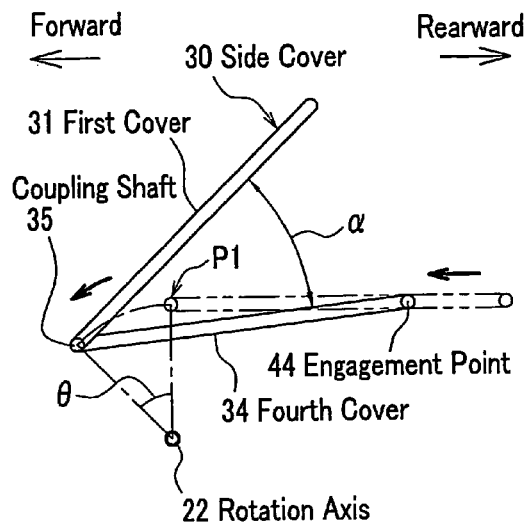
FIG. 15 is a side illustration drawing showing a relationship between an opening angle of a side cover and a tilt angle of a sunroof panel.
Figure 15B:
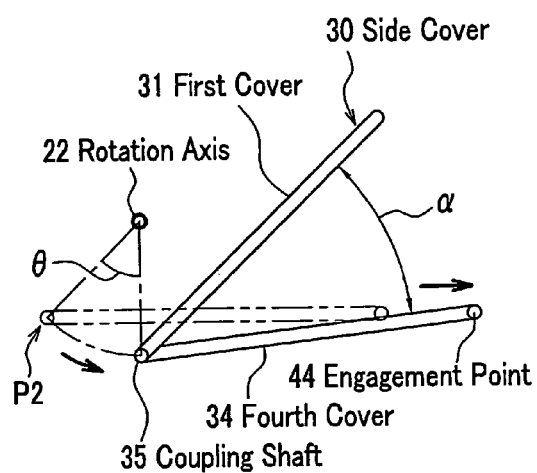

A relationship between the opening angle of the side cover 30 and the tilt angle of the sunroof panel 4 will be described, referring to FIGS. 15A to 15D. In FIG. 15A the coupling shaft 35 is positioned at a P1 above the rotation axis 22 in a close of the sunroof panel 4, and the first cover 31 and the fourth cover 34 are horizontally positioned, overlapping each other, as shown in a virtual line. From there, if accompanying a tilt up, the first cover 31 rotates, the coupling shaft 35 also rotates downward, making the rotation axis 22 its center. Assume an angle then a tilt angle θ. Because the engagement point 44 moves in a left direction in FIG. 11A so as to follow a rotation displacement of the coupling shaft 35, the fourth cover 34 becomes a state of its front-down. An intersection angle between the first cover 31 and the fourth cover 34 then, an opening angle α of the side cover 30, becomes smaller than the tilt angle θ. If when the coupling shaft 35 is also positioned at a P2 forward-obliquely below the rotation axis 22 in a close of the sunroof panel 4, the coupling shaft 35 rotates downward from there, the fourth cover 34 becomes a state of its front-down: the opening angle α of the side cover 30 then becomes smaller than the tilt angle θ.

Figure 15C:
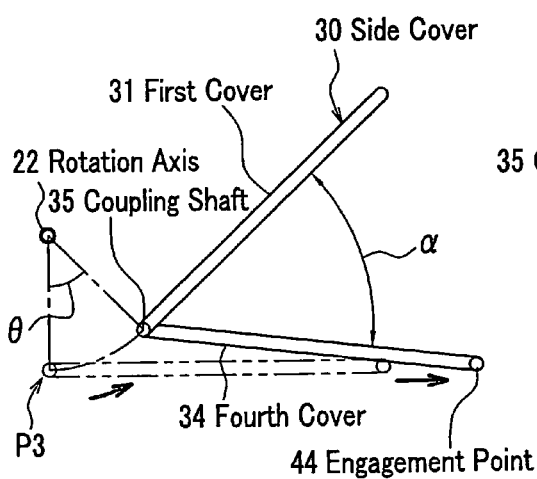
Figure 15D:
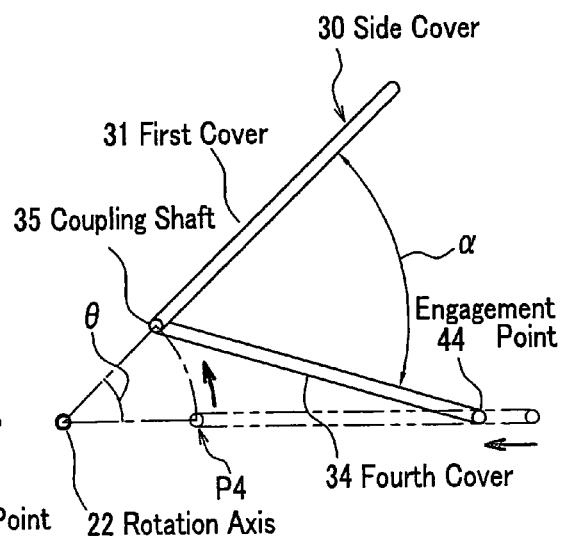
Figure 16:
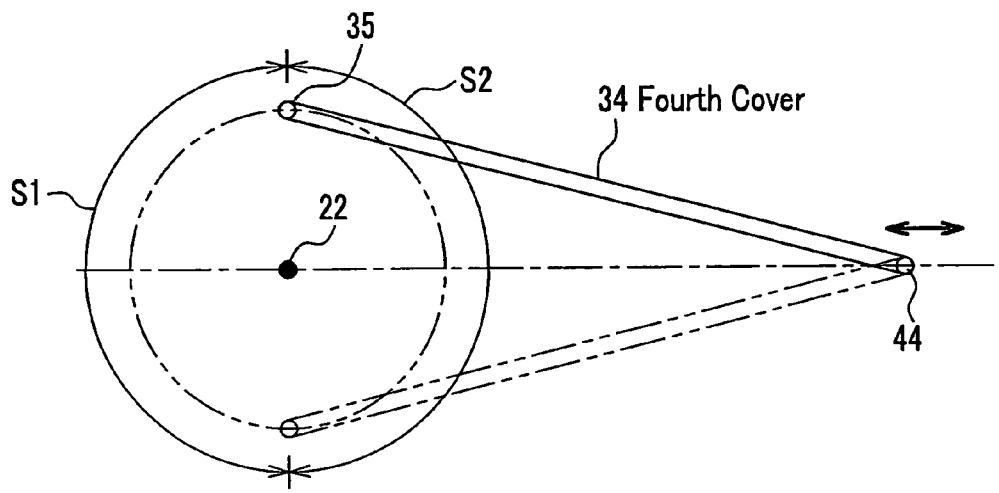
FIG. 16 is a side illustration drawing of a fourth cover.

On the contrary, in FIG. 15C if the coupling shaft 35 is positioned at a P3 beneath the rotation axis 22 in a close of the sunroof panel 4 and rotates upward from there, making the rotation axis 22 its center, the fourth cover 34 becomes a state of its rear-down: the opening angle α of the side cover 30 then becomes larger than the tilt angle θ. As in FIG. 15D, if when the coupling shaft 35 is also positioned at a rearward of the rotation axis 22 in a close of the sunroof panel 4, the coupling shaft 35 rotates upward from there, the fourth cover 34 becomes a state of its rear-down: the opening angle α of the side cover 30 then becomes larger than the tilt angle θ. The magnitude relations between the opening angle α and the tilt angle θ thus described are concretely decided by a conrod-like movement of the fourth cover 34. In other words, as shown in FIG. 16 as a schematic drawing, when the coupling shaft 35 is positioned in a range S1 and the engagement point 44 is displaced in a left side in FIG. 16, the opening angle α of the side cover 30 then becomes smaller than the tilt angle θ; when the coupling shaft 35 is positioned in a range S2 and the engagement point 44 is displaced in a right side in FIG. 16, the opening angle α of the side cover 30 then becomes larger than the tilt angle θ.

Thus making a configuration that the coupling shaft 35 is provided at a different position from the rotation axis 22 and is rotationally moved around rotation axis 22 in tiling up the sunroof panel 4, the opening angle of the side cover 30 can easily be made different for the tilt angle of the sunroof panel 4, and the side cover 30 can be appropriately opened, matching the form and arrangement of a tilt mechanism. Meanwhile, in this case it is not always necessary to regulate the rear end of the fourth cover 34, that is, the engagement point 44 by a linear movement only, and for example, if it is configured to be movable more or less in up/down directions, it is enabled to make the opening angle different for the tilt angle.

In addition, making the rear end of the fourth cover 34 a configuration of being attached to a slider member for sliding in conjunction with a slide displacement of the sunroof panel 4, the jounce of the side cover 30 can be effectively prevented without making it a complicated structure. Especially, as shown in FIG. 4 and the like, because if a slider member attached is made the drain slider 23 for always positioning the drain frame 25 beneath the rear edge of the sunroof panel 4, the drain slider 23 is not a drive slider with respect to a slide displacement of the sunroof panel 4 but has a function as a driven slider, an influence on a slide movement of the sunroof panel 4 can be reduced even when an unreasonable force is applied from the side of the side cover 30. In addition, as shown in FIG. 8, it becomes a simpler coupling structure to couple the fourth cover 34 and the drain slider 23 by the engagement of the engagement groove 42 and the engagement pin 43. Meanwhile, it similarly functions to form the engagement groove 42 and the engagement pin 43 as a reverse layout, that is, to even form the engagement groove 42 at the side of the drain slider 23 and the engagement pin 43 at the side of the fourth cover 34.

In addition, setting an opening angle of the side cover 30 smaller than a tilt angle of the sunroof panel 4, as described in FIG. 17, even when a gap occurs between rear ends of respective covers in itself, the gap can be embedded without increasing a number of the covers, and thus an appearance of the side cover 30 in tilting up the sunroof panel 4 is improved.

And as in the embodiment, making the rear end of the fourth cover 34, the engagement point 44, linearly move when the coupling shaft 35 rotationally moves around the rotation axis 22, the fourth cover 34 results in making a movement of a conrod of making the rotation axis 22 a rotation center of a crank, and thereby the opening movement of the side cover 30 becomes smooth.

In addition, as proved in FIG. 10, making a configuration that the rear end portion of each cover of the side cover 30 is formed to continue, viewed from a side thereof, when the side cover 30 opens, the appearance of the side cove 30 in tilting up the sunroof panel 4 is further improved. To be more precise, by such a method of making a rear end side of each cover a slanting 15 form, a rear end of an open state of the side cover 30 can be formed as a continuous side without a step.

Thus, although the preferred embodiment of the present invention is described, the invention is not limited to matters described in the drawings for a layout, a form, a number, and the like relating to each component thereof, and a design change thereof is available without departing from the spirit and scope of the invention.

What is claimed is:

1. A sunroof apparatus comprising:
    a sunroof panel equipped at an opening of a fixed roof of a vehicle;
    a tilt mechanism that is provided beneath a side edge of said sunroof panel, wherein the tilt mechanism is adapted to tilt the sunroof panel around a rotation axis that is disposed laterally across the vehicle; and
    a side cover adapted to shield said tilt mechanism from inside the vehicle when the sunroof panel is in a tilted position,
    wherein said side cover comprises a plurality of cover members that overlap each other laterally,
    wherein respective front ends of said cover members are coupled to a common,
    wherein one of the cover members is movably coupled to said sunroof panel and another one of the cover members is coupled to the fixed roof so that the plurality of cover members opens when the sunroof panel is moved to the tilted position, and
    wherein said coupling shaft is at a different position from said rotation axis of said sunroof panel, and
    wherein said coupling shaft is adapted to rotate around the rotation axis as the sunroof panel is tilted.

2. A sunroof apparatus according to claim 1, wherein when the sunroof panel is tilted, an opening angle of said side cover is smaller than a tilt angle of the sunroof panel.

3. A sunroof apparatus according to claim 1, wherein said another one of the cover members is configured so that when said coupling shaft rotates around the rotation axis, a rear end side of the another one of the cover members linearly moves.

4. A sunroof apparatus according to claim 3, wherein the rear end side of said another one of the cover members is attached to a slider member for sliding in conjunction with a slide displacement of the sunroof panel.

5. A sunroof apparatus according to claim 4, wherein the rear end side of said another one of the cover members and said slider member are coupled by an engagement groove coupled to an engagement pin in a manner that permits linear movement of the engagement pin through the engagement groove.

6. A sunroof apparatus according to claim 1, wherein when said side cover opens, each cover member is formed so as to prevent gaps from forming between adjacent cover members.

7. A sunroof apparatus according to claim 2, wherein when said side cover opens, each cover member is formed so as to prevent gaps from forming between adjacent cover members.

8. A sunroof apparatus according to claim 3, wherein when said side cover opens, each cover member is formed so as to prevent gaps from forming between adjacent cover members.

9. A sunroof apparatus according to claim 4, wherein when said side cover opens, each cover member is formed so as to prevent gaps from forming between adjacent cover members.

10. A sunroof apparatus according to claim 5, wherein when said side cover opens, each cover member is formed so as to prevent gaps from forming between adjacent cover members.

11. A sunroof apparatus according to claim 1, further comprising:
a fit-in portion formed in a rear end of at least a first cover member;
a hook formed in a rear end of at least a second cover member that is adjacent to the first cover member,
wherein the hook is adapted to mate with the fit-in portion so as to allow displacement of the first cover member with respect to the second cover member and regulate lateral displacement of the first cover member with respect to the second cover member.

12. A sunroof apparatus according to claim 2, further comprising:
a fit-in portion formed in a rear end of at least a first cover member;
a hook formed in a rear end of at least a second cover member that is adjacent to the first cover member,
wherein the hook is adapted to mate with the fit-in portion so as to allow displacement of the first cover member with respect to the second cover member and regulate lateral displacement of the first cover member with respect to the second cover member.

13. A sunroof apparatus according to claim 3, further comprising:
a fit-in portion formed in a rear end of at least a first cover member;
a hook formed in a rear end of at least a second cover member that is adjacent to the first cover member,
wherein the hook is adapted to mate with the fit-in portion so as to allow displacement of the first cover member with respect to the second cover member and regulate lateral displacement of the first cover member with respect to the second cover member.

14. A sunroof apparatus according to claim 4, further comprising:
a fit-in portion formed in a rear end of at least a first cover member;
a hook formed in a rear end of at least a second cover member that is adjacent to the first cover member,
wherein the hook is adapted to mate with the fit-in portion so as to allow displacement of the first cover member with respect to the second cover member and regulate lateral displacement of the first cover member with respect to the second cover member.

15. A sunroof apparatus according to claim 11, wherein when the side cover is closed, the fit-in portion is formed around an end of the second cover member.

16. A sunroof apparatus comprising:
a sunroof panel equipped at an opening of a fixed roof of a vehicle;
a tilt mechanism that is provided beneath a side edge of said sunroof panel, wherein the tilt mechanism is adapted to tilt the sunroof panel around a rotation axis that is disposed laterally across the vehicle; and
a side cover adapted to shield said tilt mechanism from inside the vehicle when the sunroof panel is in a tilted position,
wherein said side cover comprises a plurality of cover members that overlap each other said laterally,
wherein respective front ends of said cover members are coupled to a common coupling shaft,
wherein one of the cover members is movably coupled to said sunroof panel so that the plurality of cover members opens when the sunroof panel is moved to the tilted position, and
wherein said coupling shaft is at a different position from said rotation axis of said sunroof panel,
wherein said coupling shaft is adapted to rotate around the rotation axis as the sunroof panel is tilted,
wherein said coupling shaft is integrally formed from one of the cover members that is positioned at one lateral end side of the plurality of cover members;
other cover members are rotatably attached to said coupling shaft through respective connection holes formed at front ends of the other cover members;
a lock claw is protrudingly provided at said coupling shaft;
a lock hole of a form corresponding to said lock claw is formed in a cover member positioned at an opposite lateral end side of the plurality of cover members; and
wherein the lock claw engages the lock hole in a manner that prevents disengagement.

17. A sunroof apparatus comprising:
a sunroof panel equipped at an opening of a fixed roof of a vehicle;
a tilt mechanism that is provided beneath a side edge of said sunroof panel, wherein the tilt mechanism is adapted to tilt the sunroof panel around a rotation axis that is disposed laterally across the vehicle; and
a side cover adapted to shield said tilt mechanism from inside the vehicle when the sunroof panel is in a tilted position,
wherein said side cover comprises a plurality of cover members that overlap each other laterally,
wherein respective front ends of said cover members are coupled to a common coupling shaft,
wherein one of the cover members is movably coupled to said sunroof panel so that the plurality of cover members opens when the sunroof panel is moved to the tilted position, and
wherein said coupling shaft is at a different position from said rotation axis of said sunroof panel,
wherein said coupling shaft is adapted to rotate around the rotation axis as the sunroof panel is tilted,
wherein said side cover comprises at least three cover members and comprises an energizing mechanism for energizing each cover member to open in tilting up the sunroof panel, and
wherein in a central cover member sandwiched between one cover member and another cover member, a reaction force relating to a rotation direction acting on the one cover member and another reaction force relating to a rotation direction acting on the other cover member are set to be different values, respectively.

18. A sunroof apparatus according to claim 17, further comprising a second side cover, wherein respective reaction forces associated with said second side cover are identical to corresponding respective reaction forces associated with said first side cover.

19. A sunroof apparatus according to claim 17, wherein the reaction force acting on the one cover member and the another reaction force acting on the other cover member are provided at different distances from said coupling shaft.

20. A sunroof apparatus according to claim 18, wherein the reaction force acting on the one cover member and the another reaction force acting on the other cover member are provided at different distances from said coupling shaft.

* * * * *